United States Patent Office 3,534,074
Patented Oct. 13, 1970

3,534,074
PREPARATION OF α,ω-DINITROCARBOXYLIC ESTERS
Henry Feuer, West Lafayette, Ind., and Albert M. Hall, Durham, N.C., assignors to Purdue Research Foundation, Lafayette, Ind., a corporation of Indiana
No Drawing. Filed Dec. 27, 1967, Ser. No. 693,754
Int. Cl. C07c 79/40
U.S. Cl. 260—404.5                 5 Claims

---

ABSTRACT OF THE DISCLOSURE

Compositions of matter of the class α,ω-dinitrocarboxylic esters of the formula

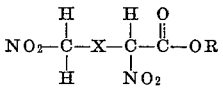

wherein X is an alkylene radical and R is an alkyl radical, useful as bactericides and fungicides and typified by methyl 2,6-dinitrohexanoate. A process for preparing α,ω-dinitrocarboxylic esters of the formula

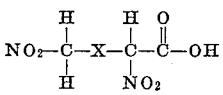

by reacting a dialkali metal salt of a dinitrocyclic ketone with an aliphatic alcohol in the presence of a weak organic acid.

BRIEF SUMMARY OF THE INVENTION

This invention relates to α,ω-dinitrocarboxylic esters. In a particular aspect, this invention relates to novel α,ω-dinitrocarboxylic esters of the formula

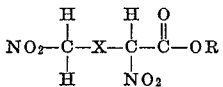

wherein X is an alkylene radical and R is an alkyl radical and to a process for preparing same.

An object of the present invention is the provision of α,ω-dinitrocarboxylic esters of the formula

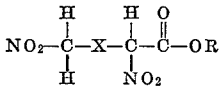

wherein X represents an alkylene radical having, for instance, from 1 up to about 10 or 20 carbon atoms, and R represents an alkyl radical having, for instance, from 1 up to about 8 carbon atoms. Included among the α,ω-dinitrocarboxylic esters of the present invention are methyl 2,5-dinitropentanoate, methyl 2,6-dinitrohexanoate, methyl 2,4-dinitrobutanoate, methyl 2,10-dinitrodecanoate, methyl 2,8-dinitrooctanoate, methyl 2,7-dinitroheptanoate, methyl 2,19-dinitrononadecanoate, methyl 2,15-dinitropentadecanoate, ethyl 2,6 - dinitrohexanoate, propyl 2,6-dinitrohexanoate, butyl 2,6-dinitrohexanoate, octyl 2,6-dinitrohexanoate, etc., and the like.

A further object of the present invention is the provision of a process for preparing α,ω-dinitrocarboxylic esters of the formula

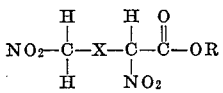

wherein X and R have the values assigned above.

Additional objects and advantages of the present invention will be apparent from the specification and the appended claims.

The α,ω-dinitrocarboxylic esters of the present invention are prepared by reacting a dialkali metal salt of an α,α'-dinitrocyclic ketone with an aliphatic alcohol in the presence of a weak organic acid.

DETAILED DESCRIPTION

In preparing the α,ω-dinitrocarboxylic esters of the present invention, the α,α'-dinitrocyclic ketone salt and aliphatic alcohol are reacted in the presence of a weak organic acid at a temperature generally in the range of from about 20 to about 200° C. Because of the slow rate of reaction at low temperatures, temperatures below about 40° C. are generally not practical. It is preferred to employ reflux temperatures, that is to say, the reflux temperature of the alcohol of choice.

The time required for the completion of the reaction can vary over a wide range and will depend, among other things, on the temperature and the particular alcohol employed, with typical reaction times ranging from 1 to about 24 hours.

Any suitable dialkali metal salt of α,α'-dinitrocyclic ketone may be employed in the preparation of this α,ω-dinitrocyclic ketones of the present invention. Typically suitable salts are the dialkali metal salts, for example the lithium salt, the potassium salt or the sodium salt of α,α'-dinitrocyclic ketones represented by the following formula

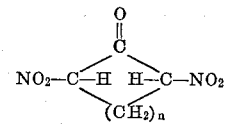

wherein n is an integer ranging from 1 up to about 20. Because of the excellent results obtained therewith, the potassium salts are generally preferred. The dialkali metal salts of α,α'-dinitrocyclic ketones are known and their preparation is disclosed in U.S. Pat. 2,868,838, issued Jan. 13, 1959, to Henry Feuer and James W. Shepherd.

Any suitable alcohol, for example those alcohols having from 1 up to about 8 carbon atoms may be employed in the preparation of the α,ω-dinitrocarboxylic esters of the present invention. Included among such alcohols are methanol, ethanol, propanol, butanol, pentanol, octanol, etc., and the like.

The acids used in the preparation of the α,ω-dinitrocarboxylic esters of the present invention must be weak organic acids. Included among such acids are acetic acid, propionic acid, butyric acid, caproic acid, etc., and the like. Because of its ready availability and the excellent results obtained therewith, acetic acid is preferred.

The α,ω-dinitrocarboxylic esters prepared in accordance with the process of the present invention may be recovered by any suitable procedure. One such procedure involves treating the α,ω-dinitrocarboxylic ester containing reaction mixture with anhydrous ether, filtering the treated mixture to remove solids and distilling the resulting filtrate to obtain the α,ω-dinitrocarboxylic ester.

The α,ω-dinitrocarboxylic esters of the present invention exhibit bactericidal and fungicidal characteristics and are useful in stabilizing petroleum lubricants against the deleterious effect of microorganisms.

The invention will be understood more fully by reference to the following specific examples. It is understood that the examples are presented for the purpose of illustration only and are not intended as a limitation of the invention.

Example 1

To a 100-ml. round bottom flask equipped with stirrer, condenser and thermometer were charged 2.12 grams (8.0 millimoles) of the dipotassium salt of α,α-dinitrocyclohexanone and 80 ml. of methanol to form a solution. To the resulting solution were added 2.4 grams (40 millimoles) of glacial acetic acid. The resulting reaction mixture had a temperature of about 25° C. The reaction mixture was stirred for 15 minutes and then refluxed at 65° C. for four hours. At the end of the four hour period the refluxed material was concentrated under vacuum to obtain a mixture of solids and oil. Anhydrous ether was added to the concentrate and the concentrate was filtered to remove solids. The filtrate was then distilled to obtain 1.15 grams of methyl 2,6-dinitrohexanoate (B.P. 138–140° C. at 0.3 mm.

*Analysis.*—Calcd. (percent): C, 38.18; H, 5.45; N, 12.73. Found (percent): C, 38.46; H, 5.55; N, 12.86.

Examples 2–3

Additional examples of the preparation of α,ω-dinitrocarboxylic esters are given in the following table. The esters were prepared following the general procedure used in Example 1.

TABLE I

| Example No. | Ketone salt | Product | Reflux time, hours | Percent yield, based on salt | Boiling point, °C. | Analyses Calcd. | Found |
|---|---|---|---|---|---|---|---|
| 2 | Dipotassium salt of α,α'-dinitrocyclopentanone. | Methyl 2,5-dinitropentanoate | 12 | 66.7 | | C, 34.95<br>H, 4.85<br>N, 13.60 | 34.97<br>4.61<br>13.69 |
| 3 | Dipotassium salt of α,α'-dinitrocyclopentanone. | Methyl 2,5-dinitropentanoate | 4 | 29.2 | 128–130 | | |

Example 4

To a 100-ml. round bottom flask equipped with stirrer and thermometer were charged 2.09 (7.9 millimoles) of the dipotassium salt of α,α-dinitrocyclohexanone and 60 ml. of methanol to form a solution. To the resulting solution was added 0.96 gram (16 millimoles) of glacial acetic acid. The resulting reaction mixture had a temperature of about 25° C. The reaction mixture was stirred for 24 hours during which period the temperature was maintained at approximately 25° C. At the end of the 24-hour period the stirred material was filtered and then concentrated under vacuum. The concentrated material was then dissolved in anhydrous ether and filtered. The filtrate was evaporated under vacuum to obtain 0.46 gram of methyl 2,6-dinitrohexanoate.

Example 5

Essentially the same procedure used in Example 1 is employed except that the disodium salt of α,α-dinitrocyclobutanone is substituted for the dipotassium salt of α,α'-dinitrocyclohexanone and ethanol is substituted for methanol to make ethyl 2,4-dinitrobutanoate.

Example 6

Essentially the same procedure used in Example 1 is employed except that the disodium salt of α,α'-dinitrocyclooctanone is substituted for the dipotassium salt of α,α'-dinitrocyclohexanone and octanol is substituted for methanol to make octyl 2,8-dinitrooctanoate.

Example 7

The following is a core oil which is protected against microorganism by the addition of α,ω-dinitrocarboxylic esters of the present invention.

Percent by weight
Crude tall oil _____ 25
Fuel oil _____ 35
Tall oil ester _____ 40

Example 8

The following is a stabilized steam cylinder oil which is protected against microorganisms by the addition of small amounts of methyl 2,6-dinitrohexanoate.

Percent by weight
SAE lubricating oil _____ 90
Oleic acid _____ 10

Since many embodiments of this invention may be made and since many changes may be made in the embodiments described, the foregoing is to be interpreted as illustrative only and the invention is defined by the claims appended hereto.

What is claimed is:
1. A process for the preparation of a composition of the formula

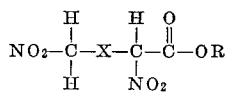

wherein X is an alkylene radical having from 1 up to about 20 carbon atoms and R is an alkyl radical having from 1 to about 8 carbon atoms which consists essentially of reacting a dialkali metal salt of an α,α'-dinitrocyclic ketone of the formula

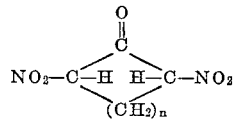

wherein n is an integer ranging from about 1 to about 20 with an aliphatic alcohol having from 1 up to about 8 carbon atoms in the presence of a week organic acid.

2. The process of claim 1 wherein the reaction is carried out at a temperature in the range of from about 20 to about 200° C.

3. The process of claim 2 wherein the reaction is carried out at approximately reflux temperature.

4. The process of claim 1 wherein the acid is acetic acid.

5. The process of claim 1 wherein the alcohol is methanol.

References Cited

Kissinger et al.: Chem. Abstracts, vol. 53 (1959), pp. 15950–1.

Kamlet et al.: J. Org. Chem., vol. 26 (1961), pp. 4371–5.

Selig: Chem. Abstracts, vol. 64 (1966), p. 9497.

JAMES A. PATTEN, Primary Examiner

U.S. Cl. X.R.

252—9, 56; 260—478; 424—311, 312

UNITED STATES PATENT OFFICE
CERTIFICATE OF CORRECTION

Patent No. 3,534,074     Dated October 13, 1970

Inventor(s) Henry Feuer and Albert M. Hall

It is certified that error appears in the above-identified patent and that said Letters Patent are hereby corrected as shown below:

Column 1, line 25, that portion of the formula reading "C-OH" should read --C-OR--.
Column 3, line 12, "140°C" should be --140°C)--; lines 38 and 53, "α,α-" should be --α,α'- --.
Column 4, line 50, "week" should be --weak--.

SIGNED AND SEALED
FEB 1971

FEB. 9, 1971

(SEAL)
Attest:

Edward M. Fletcher, Jr.
Attesting Officer

WILLIAM E. SCHUYLER, JR.
Commissioner of Patents